United States Patent
Bronoel et al.

[11] Patent Number: 6,106,974
[45] Date of Patent: Aug. 22, 2000

[54] BIPOLAR ELECTRODE FOR BATTERY WITH ALKALINE ELECTROLYTE

[75] Inventors: Guy Bronoel, Versailles; Noëlle Tassin, Fontenay-sous-Bois, both of France

[73] Assignee: Laboratoires Sorapec Societe Anonyme, Fontenay-sous-Bois, France

[21] Appl. No.: 09/142,178

[22] PCT Filed: Apr. 23, 1997

[86] PCT No.: PCT/EP97/02061

§ 371 Date: Sep. 23, 1998

§ 102(e) Date: Sep. 23, 1998

[87] PCT Pub. No.: WO98/33223

PCT Pub. Date: Jul. 30, 1998

[30] Foreign Application Priority Data

Jan. 24, 1997 [FR] France ................... 97 00789

[51] Int. Cl.[7] .................. H01M 4/70; H01M 4/24
[52] U.S. Cl. ............................ 429/210; 429/233
[58] Field of Search .................... 429/210, 233, 429/243, 241, 232

[56] References Cited

U.S. PATENT DOCUMENTS

| | | |
|---|---|---|
| 5,102,745 | 4/1992 | Tatarchuk .................. 428/605 |
| 5,200,281 | 4/1993 | Leap et al. . |
| 5,344,723 | 9/1994 | Bronoel et al. . |
| 5,593,797 | 1/1997 | Brecht ..................... 429/210 |

FOREIGN PATENT DOCUMENTS

| | | |
|---|---|---|
| 9 102 117 | 3/1993 | Netherlands . |
| 92 22936 | 12/1992 | WIPO . |

OTHER PUBLICATIONS

Patent Abstracts of Japan vol. 096, No. 008, Aug. 30, 1996 & JP 08 106906 A (Matsushita Electric Ind Co Ltd), Apr. 23, 1996, see abstract.

*Primary Examiner*—Maria Nuzzolillo
*Assistant Examiner*—Mark Ruthkosky
*Attorney, Agent, or Firm*—Henderson & Sturm LLP

[57] ABSTRACT

A bipolar electrode for alkaline batteries, including a conductive screen, a tridimensional collector provided with asperities which is plated on each side of the conductive screen, active material filling the collectors in order to constitute positive and negative electrodes, respectively, wherein at least one of each side of the conductive screen is grooved and the tridimensional collector is affixed to the conductive screen by means of a non-conductive adhesive, stable in the presence of a highly alkaline electrolyte, in direct contact with the external sides of the conductive screen by means of the asperities of the tridimensional collector.

12 Claims, 2 Drawing Sheets

BIPOLAR ELECTRODE FOR BATTERY WITH ALKALINE ELECTROLYTE

CROSS-REFERENCE TO RELATED APPLICATIONS

Not Applicable.

The present invention relates to a bipolar electrode for an alkaline electrolyte battery type comprising an electronic conductive bipolar screen on the sides of which are attached a positive and a negative electrode, respectively. Several bipolar electrodes in contact with an electrolyte, constituting the "elements" of the battery, are connected in series by means of the bipolar screen.

STATEMENT REGARDING FEDERALLY SPONSORED RESEARCH OR DEVELOPMENT

Not Applicable

BACKGROUND OF THE INVENTION

1. Field of the Invention

The present invention also is directed to has as all object an alkaline battery provided with at least one bipolar electrode, in accordance with the invention also is directed to, and a manufacturing process for such an electrode.

2. Description of the Prior Art

It is well known that resorting to a bipolar pile all, that is to say, to a frontal collecting of the charging, has shown several advantages such as, in particular, the obtaining of a high mass energy when it deals with a high voltage battery (>24 V). On the other hand, With respect to the alkaline batteries, such as the Ni-Cd, Ni-hydride, Ni-Zn, difficulties appear with such a method of assembly.

Basically, these difficulties are linked to the establishment of an electrical connection between the armature of the electrodes and the conductive screen separating the anode from the cathode; the assembly constitutes a bipolar electrode.

In patent FR 1711015 it is devised to solder the marginal portions of the electrodes (zones not filled with active materials) directly to the screen which, in many cases, is a metal strip. As a matter of fact, it was noted that the compatibility of the active material in the nickel sponges ensuring concomitantly the retention of the active materials and the collecting of the charges, cannot be effectuated after the soldering of the sponges to the strip because it leads to cracks in the strip and/or the tearing of the soldering spots.

In all instances, resorting to numerous soldering spots on the screen requires an extremely careful control of the soldering since any carelessness can bring about a perforation of the bipolar screen. Since the perforation of the screen would render the bipolar electrode unusable, it would result that such a method, although feasible, is very costly in view of the frequent adjustments and unavoidable waste.

Likewise, several patents, among which the German patent DE-A-29-07 262, submitted that the connection between the bipolar screen and the electrode or an intermediary conductive arrangement be merely carried out by pressure of the conductive zones of the electrode on the screen. Such a solution avoids any soldering but it was noted that, after a certain number of charging and discharging cycles of the element, it would lead to a progressive increase of the internal resistance of the battery, due to an increased value of the junction resistance between the metal structure of the electrode and the screen.

Furthermore, the realization of non-spillable, bipolar alkaline batteries implies that the design of the components be such, that the phenomena of recombination of the oxygen formed at the end of the charging could act with rapid kinetics. For this, in a bipolar electrode, such as the one described in patent DE-A-29 07 262, an intermediary tridimensional arrangement, such as a sponge or a sieve, is positioned between the active material of the electrodes and the bipolar screen.

Under these conditions, it is advisable to solve the aforementioned problems of connection at the level of the screen/intermediary arrangement and at the intermediary arrangement/armature of the electrodes.

On the other hand, resorting to the use of costly additional components, such as sponges and sieves, would entail significant costs.

BRIEF SUMMARY OF THE INVENTION

The present invention has the aim to significantly reduce the above-described disadvantages.

To this effect, the present invention has as chief object a bipolar electrode for alkaline batteries, comprising a conductive screen, a tridimensional collector provided with referred to herein as asperities, plated on each side of the conductive screen, and the active material filling the collectors in order to constitute the positive and negative electrodes, respectively, wherein at least one of the sides of the conductive screen is grooved and the tridimensional collectors are affixed to the conductive screen by means of a non-conductive adhesive, stable in the presence of a highly alkaline electrolyte, which tridimensional collectors are in direct contact with the external sides of the conductive screen by means of the asperities of the tridimensional collectors.

The grooves of defined width, depth and spacing, extend along the entire side of the screen, with exception of a border of defined width.

According to one of the characteristics of the invention, the grooves extend according to at least two different directions connecting with each other.

The tridimensional collector of each electrode is, by way of example, foam a sponge or expanded nickel.

The adhesive is, by way of example, an epoxy resin. The conductive screen is, by way of example, a metallic material or a polymer provided with a conductive charge.

The side of the screen facing the negative electrode is preferably covered with a cadmium or zinc layer, which layer is of a definite thickness.

In the case of a zinc electrode, the side of the electrode facing the one in contact with the conductive screen is provided with grooves while the side of the conductive screen in contact with the electrode is not grooved.

The invention relates further to an alkaline battery, particularly of Ni-Cd, Ni-hydride, Ni-Fe, or Ni-Zn type, provided with at least one bipolar electrode in accordance with the invention.

The invention relates further to a process for the manufacture of a bipolar electrode that consists in:

coating the sides of the conductive screen with a non-conductive adhesive film;

applying the asperities of the tridimensional collectors that also serve as reinforcements of the electrodes on each external side of the adhesive-coated conductive screen;

maintaining during a determined period of time a determinate pressure on the tridimensional collectors in order to remove the adhesive from between the asperities of the tridimensional collectors and the external sides of the conductive screen, and after the polymerization of the adhesive;

to suppress the pressure on the tridimensional collectors and to paste the collectors with active materials without the glazing and compacting operations of the electrodes causing a separation of the tridimensional collectors from the conductive screen.

BRIEF DESCRIPTION OF THE SEVERAL VIEWS OF THE DRAWINGS

Other advantages and characteristics appear more clearly by reading the below description making reference to the accompanying illustrations wherein.

DETAILED DESCRIPTION OF THE INVENTION

The various illustrations are represented without taking into account the scale of the drawings.

As a result of the various tests conducted within the framework of the present invention, it was shown that it would be possible to provide the electric connection of a tridimensional collector, such as a spongy or expanded metal serving as armature for the electrodes (in particular, positive ones), with the bipolar screen, by means of an adhesive bonding of this sponge to the screen. The good results that were obtained are unexpected insofar as the adhesive bonding is effectuated with a non-conductive adhesive. The success of the method is due at least in part to putting the asperities of the tridimensional collector, the spongy metal or the expanded metal into direct contact with the conductive screen by means of an adhesive film.

For this, in accordance with the invention, a determined pressure is applied to the spongy or expanded metal prior to the polymerization of the adhesive. This pressure must suffice to remove the adhesive from between the asperities of the tridimensional collectors and the external sides of the conductive screen.

After the polymerization, on the one hand is obtained a very low surface contact resistance (of the order of $10^3$ n $cm^2$) and, on the other hand, an excellent adherence between the sponge and the screen.

In order to effectuate a quick recombination of the gases formed at the end of the charging, on the one hand, it is necessary to further the separation of the oxygen from the positive electrode where it is generated and, on the other hand, to facilitate its access to the negative electrode on which it will recombine.

With this object, the present invention consists in replacing the intermediary structure not filled with active materials and positioned between the active material of the electrode and the screen by grooving the screen.

Figure 1:
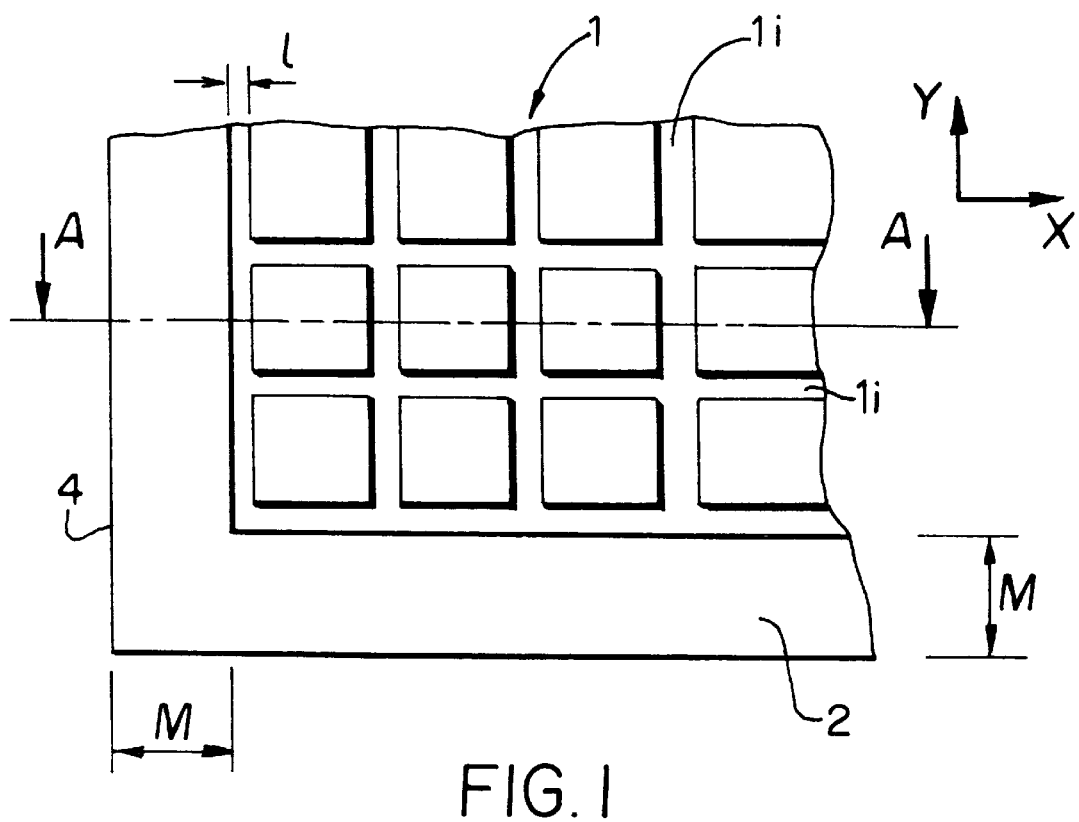
FIGS. 1 and 2 show a partial view of a conductive screen of a bipolar electrode in accordance with the invention, seen from above and along the axis A—A, respectively.
Figure 2:
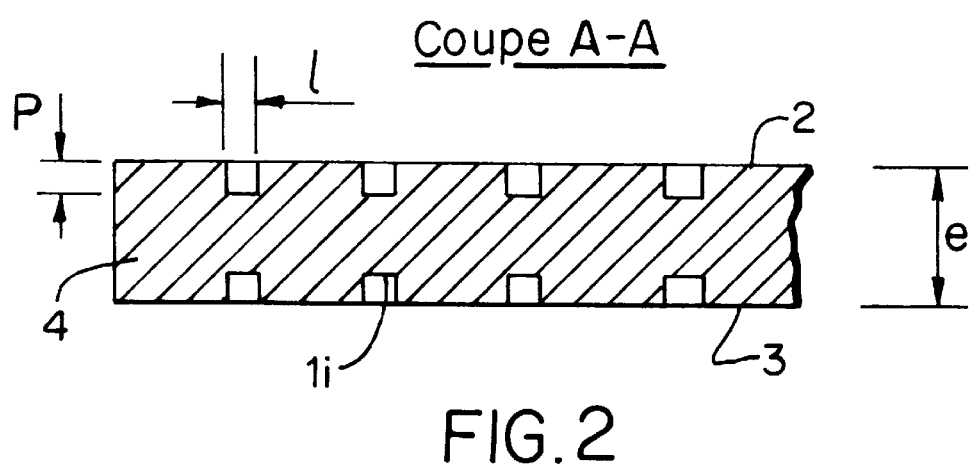

FIGS. 1 and 2 represent an example of the grooving 1 on the sides 2 and 3 of the conductive screen 4 of a bipolar electrode in accordance with the invention, respectively, according to a top view and a cross section along the axis A—A.

The grooves $1i$ have a width 1, comprised between about 1 and about 5 mm, and a depth P, between approximately 0.005 and 0.2 mm, and they are spaced at about 5 to 12 mm.

In one embodiment where the screen 4 is a fully metallic screen, the thickness e of the latter must not be very significant and, under these conditions, the depth P of the grooves $1i$ shall not exceed about 0.1 mm.

The grooving 1 of the screen 4 can be effectuated following only one or several directions, for example, as shown in FIGS. 1 and 2, running along two perpendicular axes X and Y, each groove $1i$ connecting with the others, thus allowing the passage of the gases in all the directions.

The grooves $1i$ extend over the entire surface of the sides 2 and 3 of the conductive screen 4, with exception of a border M of about 15 mm around the periphery of the screen 4.

These borders allow the securing of the screen 4 to the inside of a battery element.

Furthermore, since the connection between the sponge of the electrode and the bipolar screen is no longer made by solder, it is now possible to use as screen a conductive polymer (the conduction being given, for example, by a carbon charging); the density of this material allowing to use a screen having a thickness of up to about 0.5 mm. Under these conditions, the grooves may have an approximate depth of about 0.2 mm.

Although a priori it was conceivable to use directly a conductive polymer screen, more interesting results with respect to the contact resistance were obtained when the surface of the polymer was coated with a metallic layer of slight thickness (less than 10 $\mu$m). Thus, the side of the screen in contact with the positive electrode is first covered with a nickel layer having a thickness of about 5 $\mu$m. This coating can be obtained by chemical means (reduction of the Ni salts by hypophosphite) or electrochemically.

With respect to the negative electrode, in the case of cadmium or hydrides electrodes, the surface of the screen is grooved in the same manner as previously indicated for the surface in contact with the positive electrode, and covered by cadmium or zinc plating in order to limit the risks of evolution of hydrogen.

On the other hand, in an embodiment of a bipolar electrode in accordance with the present invention using a zinc electrode, the grooving of the screen is inoperative because the grooves become progressively obturated by the depositing of zinc. Under these conditions, in order to facilitate the access of the oxygen to the entire zinc electrode, the side of the zinc electrode facing the one in contact with the screen is preferably grooved.

In the case of Ni-Cd or Ni-hydride batteries, the grooving of the screen, as well as of the negative side of the positive electrode, allows thus the easy evolution of the oxygen on the surface of the positive electrodes facing the conductive screen and its recombination on the surface of the negative electrodes facing the conductive screen. The transfer of the oxygen from one electrode to the other is carried out in the space existing between the edge of the electrodes and the separator and the wall of the element.

On the other hand, in an embodiment of an electrode in accordance with the present invention applied to the case of Ni-Zn batteries would be used an ion exchange membrane separating the anodic section from the cathodic section; should a sealing be provided in some cases around all the edges of the membrane, a specific method for the passage of the gases must be envisioned.

Figure 3:
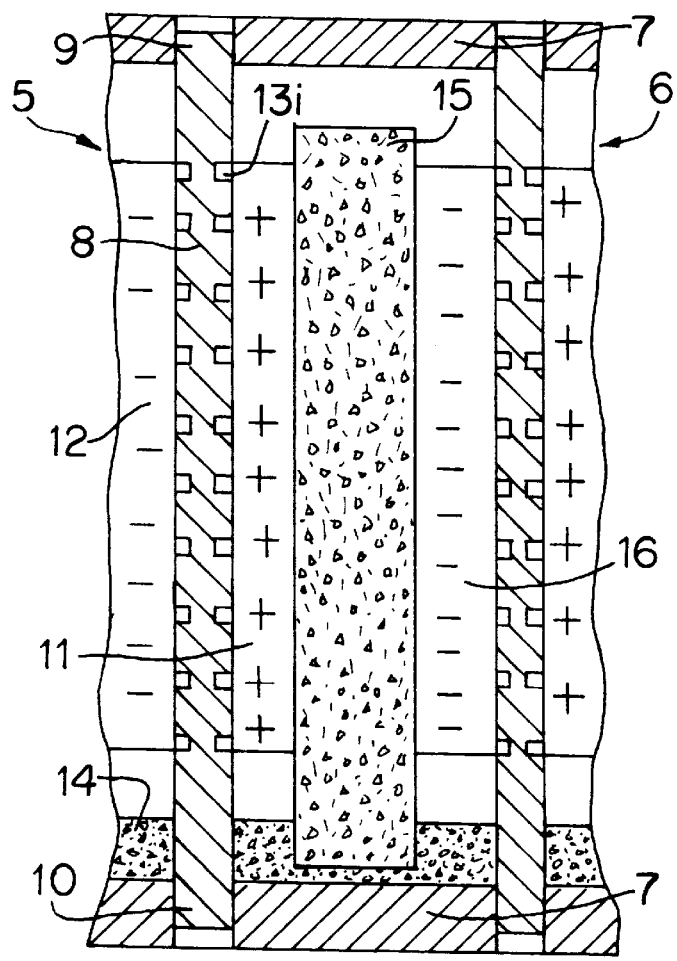
FIG. 3 shows a partial diagrammatic view of a cross section of an alkaline battery, in particular a Ni-Cd or Ni-hydride battery, provided with bipolar electrodes in accordance with the invention connected in series.
Figure 4:
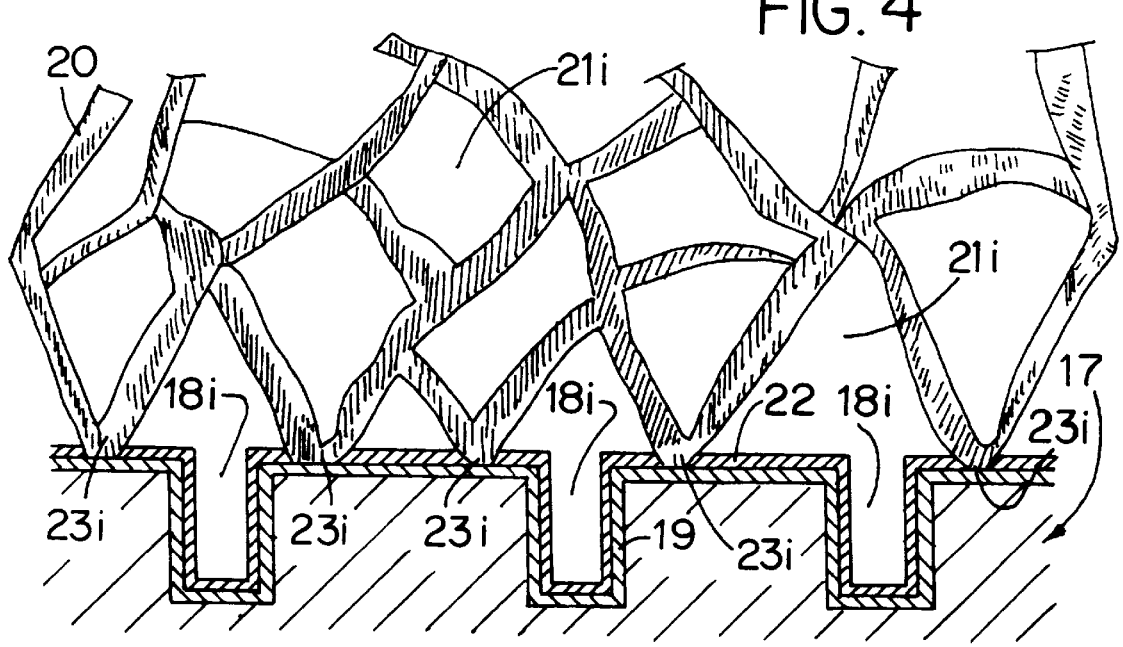
FIG. 4 shows a detail view of a section of a bipolar electrode in accordance with the invention, in which are represented the screen and the tridimensional structure after its adhesive bonding to the screen and before its filling with active material.

FIG. 3 illustrates an example of the connecting in series the bipolar electrodes 5 and 6 in accordance with the invention, applied to the embodiment of a battery, in particular a N-Cd or i-hydride battery.

A frame 7 provides the holding of the 5 and 6 and the sealing of the battery.

A bipolar electrode 5 in accordance with the present invention comprises a bipolar conductive screen 8, secured at its extremities 9 and 10 to the frame 7, a positive electrode 11 and a negative electrode 12 affixed, respectively, to the surfaces of the bipolar screen 8 and more or less centered with respect to the latter.

In this example, the side of the screen receiving the positive electrode 11 is provided with grooves 13i of the same type as the ones represented in FIGS. 1 and 2, by way of example, but on only one side of the screen 8.

These grooves 13i allow the removal of the oxygen given off on the external side of the positive electrode 11.

The bipolar electrode 5 soaks by the conductive screen 10 in a bath solution 14. The electrodes 5 and 6 are separated from each other by a separator 15.

The separator 15 is impregnated with electrolyte and rests on its base in the bath solution 14.

It is cramped between the positive electrode 11 of the bipolar electrode 5 and the negative electrode 16 of the adjacent bipolar electrode 6.

One itemized method of embodiment of a bipolar electrode in accordance with the invention provided with a positive electrode of NiOOH/Ni(OH)$_2$ type and a conductive screen is described below by way of A non limiting example with respect to FIG. 3.

The screen 17 is constituted by a polymer plate rendered conductive by carbon charging. The polymer is stable in an alkaline medium. The overall thickness of the plate 17 is of 0.4 mm. The grooves 18i located on the surface in contact with the positive electrode have a width of about 1 mm and a depth of about 0:2 mm. The distance between two grooves is about 8 mm. The grooving extends over the entire surface of the plate 17, with exception of a border M of about 15 mm represented in FIGS. 1 and 2, located all around the plate 20, being said border M being intended for the sealing of the battery.

The grooved side is covered with a nickel layer 19, save the borders M, the thickness of the Ni layer being 5 $\mu$m. In its grooved section, the plate 17 has a surface of about 200 mm ×200 mm, that is to say, about 4 dm$^2$.

The nickel sponge 20 is constituted by a plate, of which the thickness is about 2.2 mm and the external dimensions are about 195 mm ×195 mm. The opening of its cells 21i is of the order of about 0.25 mm, corresponding to the product ppi 125, manufactured by the company Nitech under the name MN 090.

The used adhesive bonding is an epoxy resin, stable in alkaline medium, such as the product Scotchweld of the 3M Corp. It is fluidized by an appropriate solvent (for example, acetone) in such a manner that the coating of the external surface of the grooved screen 17 leads to the depositing of an adhesive film 22, represented with heavy lines in the Figure, whose thickness shall not exceed 50 $\mu$m, in any case at least equal to 10 $\mu$m.

The spongy nickel 20 rests on the external sections of the screen 17, that is to say, on the external portions of the grooves 18i, by means of its asperities 23i.

The plate of spongy nickel 20 is applied on the side of the screen 17 coated with adhesive 22 by maintaining during at least one half hour a pressure comprised between 1.3 and 1.8 kg/cm$^2$. At ambient temperature, the polymerization is effectuated in about 6 hours. This operation can be effectuated faster by a heating under an infrared light. After the polymerization, the pressure can be suppressed. It is then possible to effectuate the coating of the sponge 20 with the active material (not represented) without the glazing and compaction operations separating the sponge 20 from the screen.

What is claimed is:

1. A bipolar electrode for alkaline batteries, comprising a conductive screen, a tridimensional collector provided with asperities said tridimensional collectors being plated on each side of the conductive screen, active material filling the collectors in order to constitute positive and negative electrodes, respectively, wherein at least one of said each side of the conductive screen is grooved and the tridimensional collector is affixed to the conductive screen by means of a non-conductive adhesive, stable in the presence of a alkaline electrolyte, in direct contact with the external sides of the conductive screen by means of the asperities of the tridimensional collector.

2. A bipolar electrode in accordance with claim 1, wherein grooves of definite width, depth and spacing extend over an entire side of the conductive screen except for a margin of determined width.

3. A bipolar electrode in accordance with claim 2, wherein the grooves extend in accordance with at least two different directions, connecting one with the other.

4. A bipolar electrode in accordance with claim 1, wherein the tridimensional collector of each electrode comprises at least one member selected from the group consisting of sponge and expanded nickel.

5. A bipolar electrode in accordance with claim 1, wherein the adhesive comprises an epoxy resin.

6. A bipolar electrode in accordance with claim 1, wherein the conductive screen comprises a metallic material.

7. A bipolar electrode in accordance with claim 1, wherein the conductive screen comprises a polymer having a conductive charge.

8. A bipolar electrode in accordance with claim 1, wherein a side of the conductive screen facing the negative electrode is covered with a layer of material comprising a member selected from the group consisting of cadmium and zinc said layer comprising a definite thickness.

9. A bipolar electrode in accordance with claim 1, wherein the side of the conductive screen facing the positive electrode is covered with a nickel layer of definite thickness.

10. A bipolar electrode in accordance with claim 1, wherein, said electrode comprises a zinc electrode, and a side of the zinc electrode facing a side in contact with the conductive screen is provided with grooves and a side of the conductive screen in contact with the electrode is not grooved.

11. An alkaline battery comprising at least one bipolar electrode selected from claims 1 to 9.

12. A process for the manufacture of a bipolar electrode comprising:

coating sides of a conductive screen with a non-conductive adhesive film to form an adhesive-coated conductive screen;

applying asperities of tridimensional collectors that also serve as reinforcements of electrodes on each external side of the adhesive-coated conductive screen;

maintaining on the tridimensional collectors a determinate pressure during a determined period of time in order to remove adhesive from between the asperities of the tridimensional collectors and the external side of the conductive screen, and after polymerization of the adhesive;

suppressing pressure on the tridimensional collectors; and pasting the tridimensional collectors with active materials without glazing and compacting operations of the electrodes causing a separation of the tridimensional collectors from the conductive screen.

* * * * *